US010573860B2

(12) United States Patent
Chellew et al.

(10) Patent No.: US 10,573,860 B2
(45) Date of Patent: Feb. 25, 2020

(54) CORDLESS POWER TOOL BATTERIES

(71) Applicant: Ingersoll-Rand Company, Davidson, NC (US)

(72) Inventors: Justin T. Chellew, Lebanon, NJ (US); Roger B. Davis, Clinton, NJ (US); Dennis Naksen, Chatham, NJ (US)

(73) Assignee: Ingersoll-Rand Company, Davidson, NC (US)

( * ) Notice: Subject to any disclaimer, the term of this patent is extended or adjusted under 35 U.S.C. 154(b) by 692 days.

(21) Appl. No.: 14/084,221

(22) Filed: Nov. 19, 2013

(65) Prior Publication Data

US 2015/0140384 A1 May 21, 2015

(51) Int. Cl.
*H01M 2/10* (2006.01)

(52) U.S. Cl.
CPC ...... *H01M 2/1022* (2013.01); *H01M 2220/30* (2013.01)

(58) Field of Classification Search
CPC ... H01M 2/1022; H01M 2/10; H01M 2220/30
USPC ......................................................... 429/96
See application file for complete search history.

(56) References Cited

U.S. PATENT DOCUMENTS

| 5,123,913 | A | | 6/1992 | Wilk et al. |
|---|---|---|---|---|
| 5,213,913 | A | * | 5/1993 | Anthony, III ............. B25F 5/02 292/244 |
| D387,728 | S | | 12/1997 | Kawakami et al. |
| D412,485 | S | | 8/1999 | Kato et al. |
| 6,168,881 | B1 | | 1/2001 | Fischer et al. |
| 6,326,101 | B1 | * | 12/2001 | White ................. H01M 2/1022 429/100 |
| D466,863 | S | | 12/2002 | Zurwelle et al. |
| 6,500,581 | B2 | | 12/2002 | White et al. |
| 6,840,335 | B1 | * | 1/2005 | Wu ........................... B25F 5/02 173/217 |
| D540,639 | S | * | 4/2007 | Watson ........................... D8/68 |
| 7,453,234 | B2 | | 11/2008 | Phillips et al. |
| D590,333 | S | | 4/2009 | Price et al. |
| D597,935 | S | | 8/2009 | Aglassinger |
| 7,619,387 | B2 | | 11/2009 | Amend et al. |
| 7,858,219 | B2 | | 12/2010 | Agehara et al. |
| D640,975 | S | | 7/2011 | Okuda et al. |

(Continued)

FOREIGN PATENT DOCUMENTS

| CN | 201174393 | 12/2008 |
|---|---|---|
| CN | 101511549 | 8/2009 |

OTHER PUBLICATIONS

Robert Bosch Tool Corp., "Operating/Safety Instructions for HDS182 and DDS182," Sep. 2013, 44 pages.

(Continued)

*Primary Examiner* — Michael L Dignan

(74) *Attorney, Agent, or Firm* — Jones IP Group; Wayne A. Jones

(57) ABSTRACT

In at least one illustrative embodiment, a cordless power tool battery may comprise a housing, a power storage unit, a first release button, and a second release button. The housing may have a first side wall and a second side wall spaced apart from the first side wall. The first release button may be coupled to the housing and extend along more than half of the first side wall of the housing. The second release button may be coupled to the housing and extend along more than half the second side wall of the housing.

12 Claims, 4 Drawing Sheets

(56) References Cited

U.S. PATENT DOCUMENTS

| | | |
|---|---|---|
| 8,048,552 B1 | 11/2011 | Mao |
| 8,154,249 B2 | 4/2012 | Johnson et al. |
| D658,578 S | 5/2012 | Davis |
| 8,207,702 B2 | 6/2012 | Johnson et al. |
| 8,353,364 B2 | 1/2013 | Kondo et al. |
| D681,550 S | 5/2013 | Corbin |
| D682,193 S | 5/2013 | Corbin |
| 2004/0081883 A1 | 4/2004 | Mooty et al. |
| 2006/0199072 A1 | 9/2006 | Lui et al. |
| 2007/0108942 A1 | 5/2007 | Johnson et al. |
| 2009/0229842 A1* | 9/2009 | Gray ............... H01M 2/1055 173/20 |
| 2009/0246608 A1* | 10/2009 | Wu ................ H01M 2/1055 429/100 |
| 2011/0297411 A1* | 12/2011 | Johnson ............ H01M 2/1055 173/217 |
| 2013/0136956 A1* | 5/2013 | Nakano ............ H01M 2/105 429/7 |
| 2014/0272516 A1* | 9/2014 | Tennison .......... H01M 2/105 429/120 |

OTHER PUBLICATIONS

Dewalt Industrial Tool Co., "Instruction Manual for DCD980 20V MAX* Heavy-Duty ½" (13 mm) Cordless Drill/Driver," 2012, 55 pages.
Milwaukee Electric Tool Corp., "Operator's Manual for M18™ Li-ION Battery Charges and Battery Packs," Sep. 2012, 13 pages.
Chinese First Office Action; Application No. 201410548732.4; dated Jun. 27, 2016.

* cited by examiner

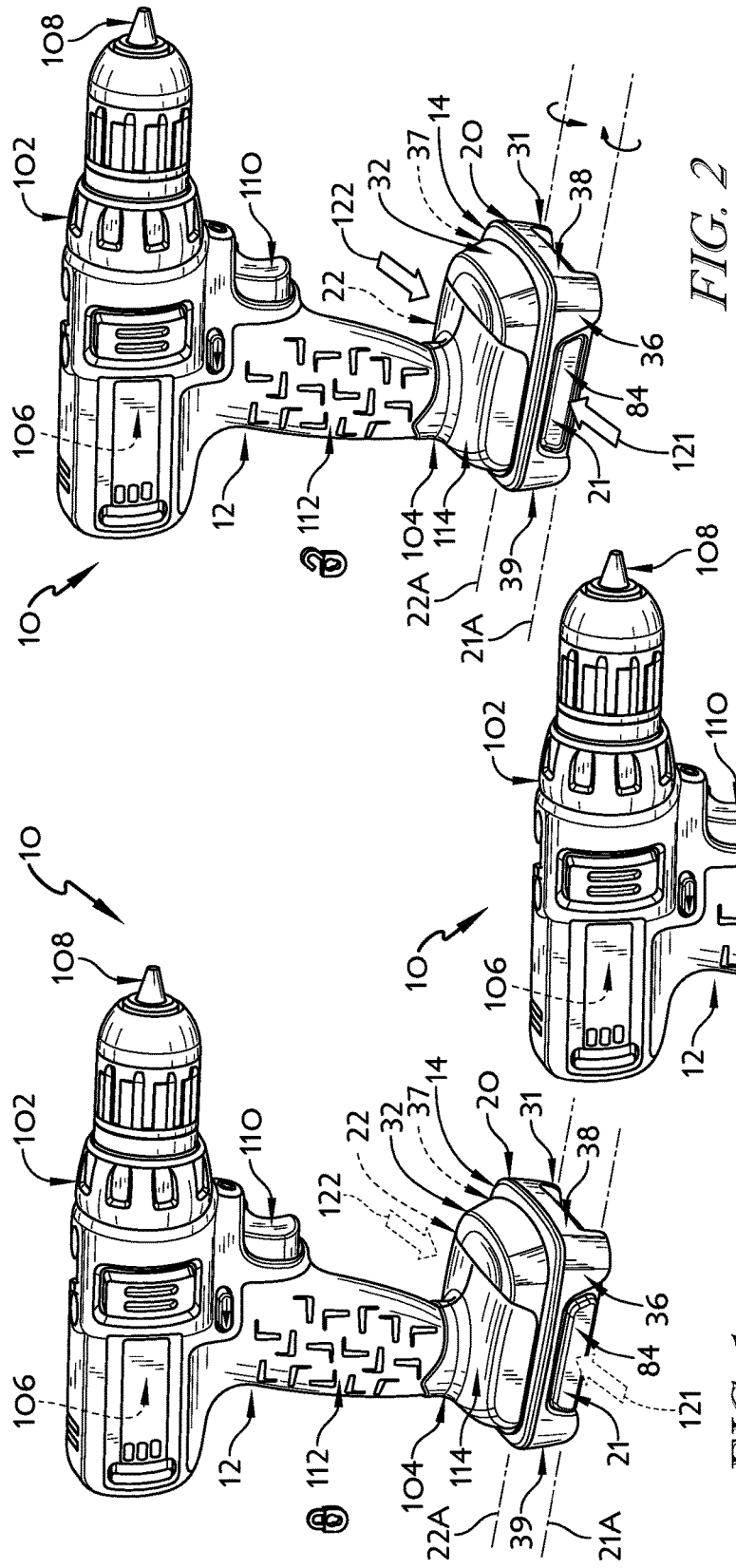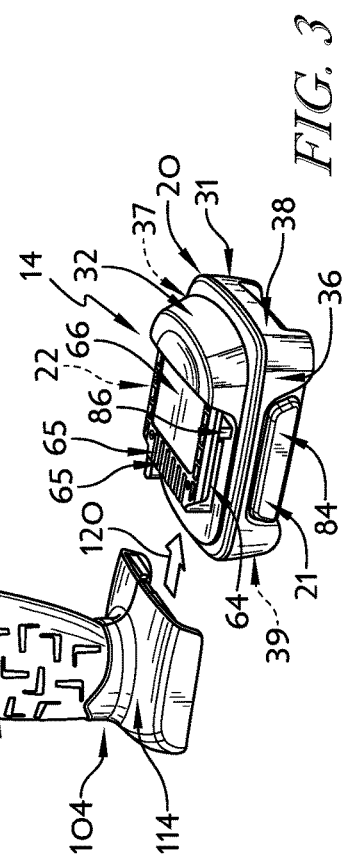

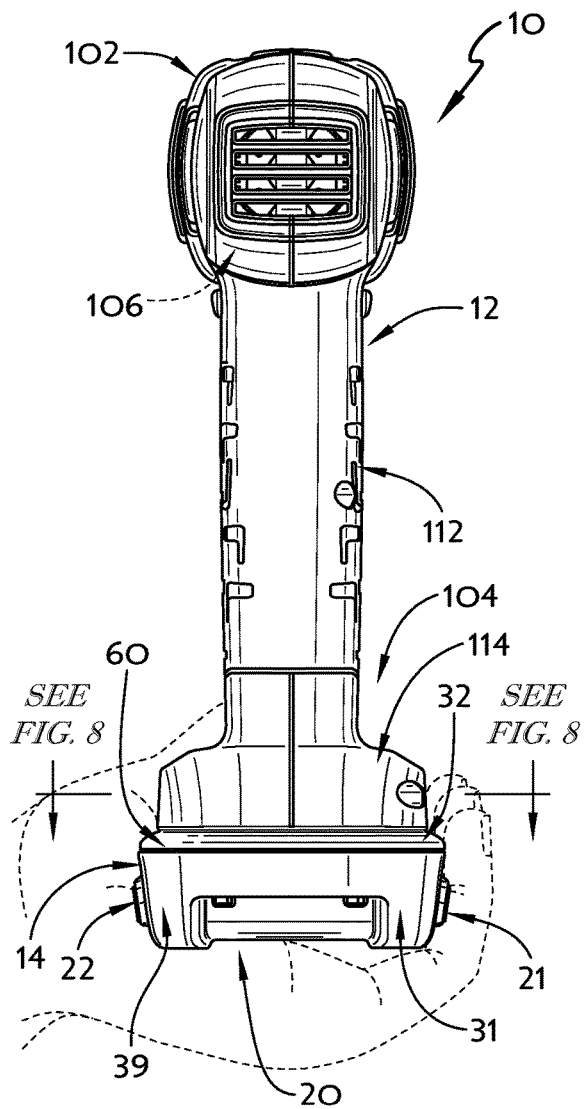
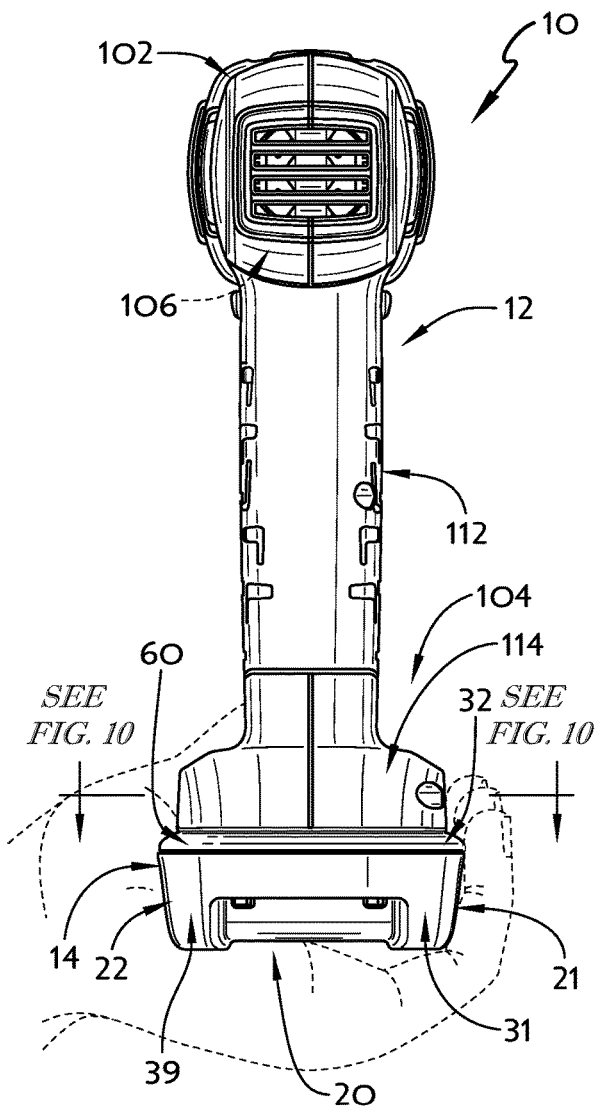
FIG. 7
FIG. 9
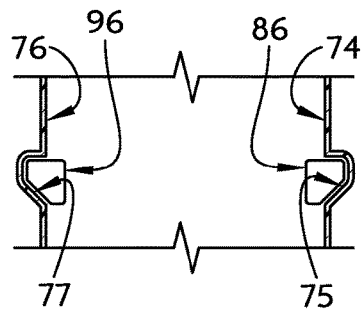
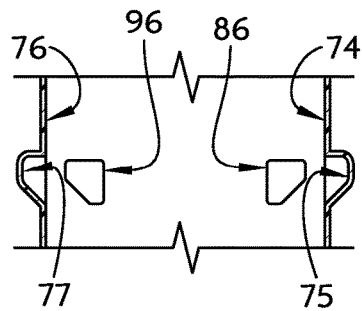
FIG. 8
FIG. 10

CORDLESS POWER TOOL BATTERIES

TECHNICAL FIELD

The present disclosure relates, generally, to batteries and, more particularly, to batteries for use with cordless power tools.

BACKGROUND

Cordless power tools are regularly used with batteries (to form cordless power tool systems). The batteries of such cordless power tool systems are often configured to be removably coupled to and decoupled from the cordless power tools to facilitate recharging of the batteries. However, the batteries of many prior cordless power tool systems can be cumbersome for users to detach from the cordless power tools.

SUMMARY

According to one aspect, a cordless power tool battery may comprise a housing having a first side wall and a second side wall spaced apart from the first side wall, the first side wall extending from a first end of the housing to a second end of the housing, the second side wall extending from the first end of the housing to the second end of the housing; a power storage unit supported in the housing, the power storage unit configured to supply electrical power to a cordless power tool removably coupled to the battery; a first release button coupled to the housing, the first release button extending along more than half of the first side wall of the housing between the first end of the housing and the second end of the housing; and a second release button coupled to the housing, the second release button extending along more than half the second side wall of the housing between the first end of the housing and the second end of the housing.

In some embodiments, first release button may comprise a press pad accessible to a user through a first aperture formed in the first side wall and a retention feature adapted to engage a complementary retention feature included in the cordless power tool. The first side wall may be formed to include a main portion and a recessed portion. The recessed portion may be indented from the main portion toward the second side wall to form a cavity in the first side wall. The first aperture may be formed in the recessed portion of the first side wall. The housing may comprise a floor, the first and second side walls may extend upwardly from the floor, and the cavity formed in the first side wall may extend upwardly from a level of the floor. The cavity may be sized to receive a heel of a hand of the user.

In some embodiments, the housing may comprise a lower shell and an upper shell coupled to the lower shell. The lower shell may be formed to include a floor and the first and second side walls. The first and second side walls may extend upwardly from the floor. The upper shell may be formed to include a cap wall coupled to the first and second side walls of the lower shell and a projection extending upwardly from the cap wall. The projection may comprise a pedestal extending upwardly from the cap wall and a platform extending outwardly from the pedestal. The pedestal, the platform, and the cap wall may cooperate to define a first side-opening channel and a second side-opening channel, where the second side-opening channel faces away from the first side-opening channel. The first side-opening channel and second side-opening channel may be sized to receive, respectively, a first rail and a second rail of the cordless power tool. The pedestal may be formed to include a retainer opening, and the retention feature of the first release button may extend through the retainer opening into the first side-opening channel. The first aperture formed in the first wall may be spaced apart from the upper shell.

According to another aspect, a cordless power tool system may comprise a cordless power tool and a battery removably coupled to the cordless power tool to supply electrical power to the cordless power tool. The battery may comprise a housing, a first release button coupled to the housing, and a second release button coupled to the housing. The first and second release buttons may be movable between a locked position engaged with the cordless power tool to block movement of the battery away from the cordless power tool and an unlocked position disengaged from the cordless power tool to allow movement of the battery away from the cordless power tool. The first release button may extend along a bottom edge of a first side wall of the housing over more than half of a length of the first side wall, and the second release button may extend along a bottom edge of a second side wall of the housing over more than half of a length of the second side wall.

In some embodiments, the housing may comprise a lower shell and an upper shell coupled to the lower shell, where the lower and upper shells cooperate to define an interior space of the housing. The lower shell may comprise a floor, the first side wall, the second side wall, a third side wall, and a fourth side wall. The third and fourth side walls may each extend between the first and second side walls, and the first, second, third, and fourth side walls may each extend upwardly from the floor. The first side wall may be formed to include a first aperture, and the second side wall may be formed to include a second aperture. The first release button may comprise a first retention feature and a first press pad, and the second release button may comprise a second retention feature and a second press pad. The first press pad may extend through the first aperture, and the second press pad extending through the second aperture.

In some embodiments, the first and second apertures may each be spaced apart from the upper shell. The upper shell may be formed to include a first retainer opening and a second retainer opening, where the first retention feature extends through the first retainer opening, and the second retention feature extends through the second retainer opening. The upper shell may comprise a cap wall and a projection extending upwardly from the cap wall. The cap wall may be coupled to the first, second, third, and fourth side walls of the lower shell. The projection may comprise a pedestal extending upwardly from the cap wall and a platform extending outwardly from the pedestal. The pedestal, the platform, and the cap wall may cooperate to define a first side-opening channel and a second side-opening channel, where the second-side opening channel faces away from the first side-opening channel. The first side-opening channel may receive a first inwardly-extending rail of the cordless power tool, and the second side-opening channel may receive a second inwardly-extending rail of the cordless power tool.

A method of removing a battery from a cordless power tool may comprise gripping the cordless power tool with a first hand; gripping the battery with a second hand such that a plurality of fingers of the second hand contact a first release button arranged along a first side wall of the battery and such that a heel or a thumb of the second hand contacts a second release button arranged along a second side wall of the battery, the first release button extending along more than half of a length of the first side wall, and the second release button extending along more than half of a length of the second side wall; moving the plurality of fingers and the heel of the second hand toward one another to disengage the first and second release buttons from the cordless power tool; and moving the battery away from the cordless power tool, while maintaining the grip on the cordless power tool with the first hand and the grip on the battery with the second hand.

In some embodiments, moving the battery away from the cordless power tool may comprise sliding the battery parallel to the length dimensions of the first and second side walls. The first side wall of the battery may comprise a recessed portion sized to receive the plurality of fingers of the second hand, and the second side wall of the battery comprises a recessed portion sized to receive the heel of the second hand.

BRIEF DESCRIPTION OF THE DRAWINGS

The concepts described in the present disclosure are illustrated by way of example and not by way of limitation in the accompanying drawings. For simplicity and clarity of illustration, elements illustrated in the drawings are not necessarily drawn to scale. For example, the dimensions of some elements may be exaggerated relative to other elements for clarity. Further, where considered appropriate, reference labels have been repeated among the drawings to indicate corresponding or analogous elements.

FIG. 1 is a perspective view of one illustrative embodiment of a cordless power tool system including a cordless power tool and a battery removably coupled to the cordless power tool;

FIG. 2 is a perspective view of the cordless power tool system of FIG. 1, in which release buttons of the battery have been moved from a locked position to an unlocked position;

FIG. 3 is a perspective view of the cordless power tool system of FIGS. 1 and 2, in which the battery has been detached from the cordless power tool;

FIG. 7 is a rear elevation view of the cordless power tool system of FIGS. 1-4, in which the battery is removably coupled to the cordless power tool with the release buttons in the locked position;

FIG. 8 is a rear elevation view of the cordless power tool system of FIGS. 1-4, in which the battery is removably coupled to the cordless power tool with the release buttons in the unlocked position;

FIG. 9 is a partial cross-sectional view of the cordless power tool system of FIGS. 7; and FIG. 10 is a partial cross-sectional view of the cordless power tool system of FIG. 9.

DETAILED DESCRIPTION OF THE DRAWINGS

Figure 4:
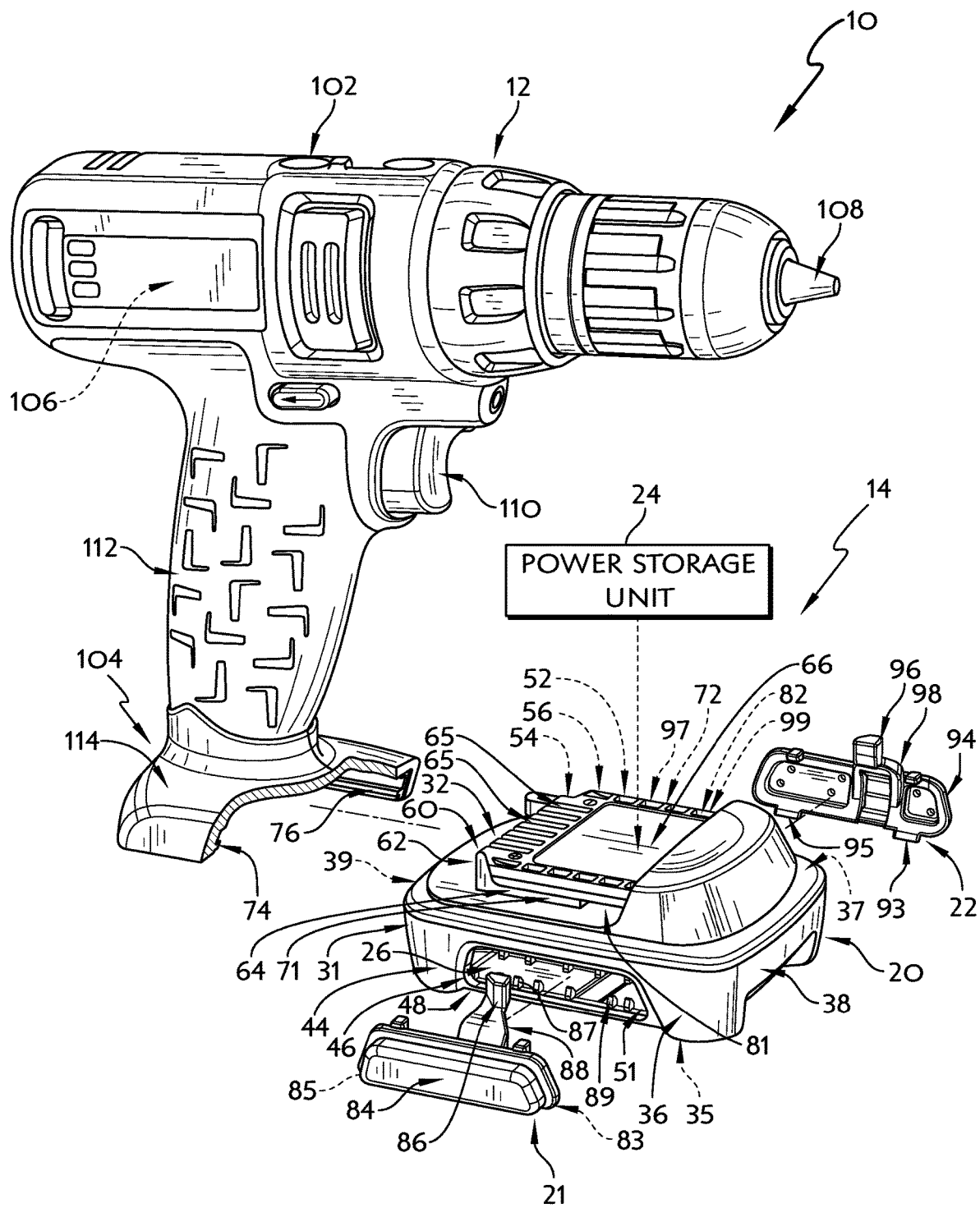
FIG. 4 is an exploded perspective view of the cordless power tool system of FIGS. 1-3.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

One illustrative embodiment of a cordless power tool system 10 including a cordless power tool 12 and a battery 14 is shown in FIG. 1. While the tool 12 is illustratively embodied as a cordless drill/driver, it is contemplated that the presented disclosed batteries 14 may be used with any number of other cordless power tools. For instance, the tool 12 might be embodied as a driver, a drill, a saw, a sander, a flashlight, a radio, or another cordless tool/device. The battery 14 is removable from the tool 12 to allow for recharging or replacement of the battery 14.

The battery 14 illustratively includes a housing 20, a left release button 21, a right release button 22, and a power storage unit 24 as shown, for example, in FIG. 4. As shown in FIG. 1, the housing 20 of the battery 14 is configured to mate with the tool 12 so that the power storage unit 24 is electrically connected to corresponding circuitry in the tool 12. In the illustrative embodiment, the left and right release buttons 21, 22 are each independently coupled to the housing 20 and are each selectively engaged with the tool 12 to block the battery 14 from being detached from the tool 12. The power storage unit 24 is received in an interior space 26 formed by the housing 20 and is illustratively embodied as a lithium ion based power storage device. It will be appreciated that, in other embodiments, the power storage unit 24 may be embodied as any other type of device configured to supply electrical power to the tool 12 (when the battery 14 is removably coupled to the tool 12).

The housing 20 and the left and right release buttons 21, 22 are sized and arranged to allow for one-handed release and removal of the battery 14 from the tool 12, without a user having to adjust his/her grip on the battery 14, as suggested in FIGS. 7 and 9. To this end, the housing 20 is sized to be gripped by one hand as shown in FIGS. 7 and 9 (allowing the user to maintain a grip on the tool 12 with his/her other hand). In particular, the left release button 21 is sized and arranged to be pressed by a plurality of fingers of a user's hand, while the right release button 22 is sized and arranged to be pressed by a heel (or thumb) of the user's hand (or vice versa). In the illustrative embodiment, the left release button 21 extends along a left side of the housing 20 over more than half of the length of the left side of the housing 20 to accommodate the plurality of fingers of the hand (see FIG. 5), while the right release button 22 extends along a right side of the housing 20 over more than half of the length of the right side of the housing 20 (see FIG. 6). In other words, the left and right release buttons 21, 22 each extend along at least half of a maximum length dimension of the housing 20.

Figure 5:
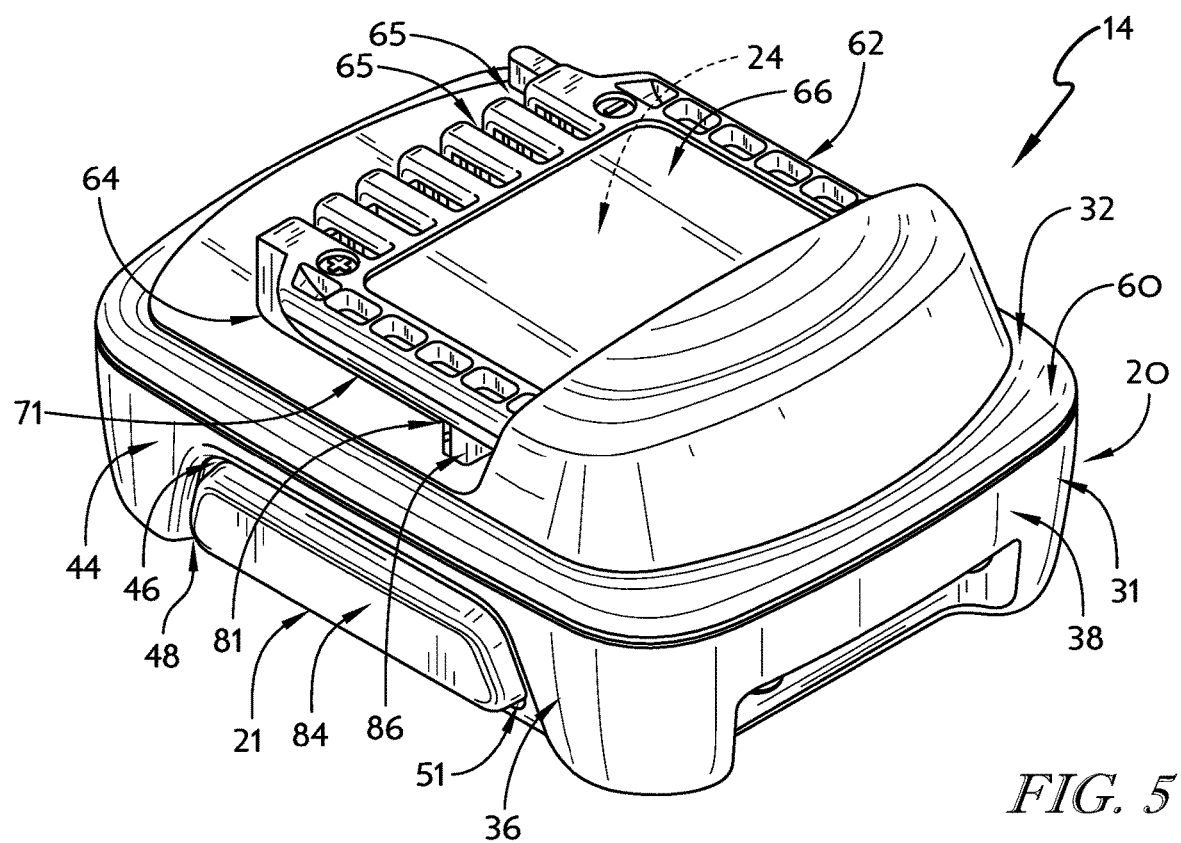
FIG. 5 is a left side perspective view of the battery of FIGS. 1-4.
Figure 6:
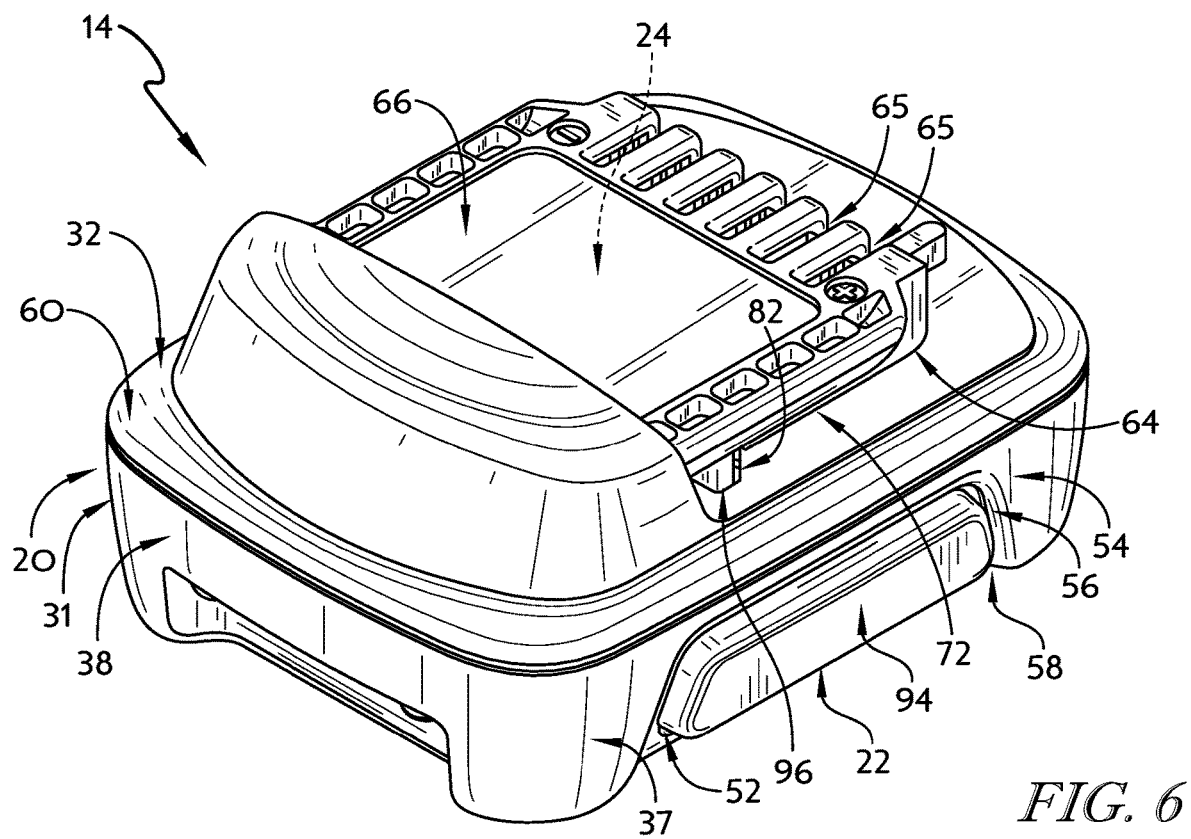
FIG. 6 is a right side perspective view of the battery of FIGS. 1-4.

The housing 20 includes a lower shell 31 and an upper shell 32 that cooperate to define interior space 26 as shown, for example, in FIG. 4. The lower shell 31 is illustratively a monolithic component that includes a floor 35, a left side wall 36, a right side wall 37, a front wall 38, and a back wall 39 as shown in FIGS. 4-6. Upper shell 32 is illustratively a monolithic component and is coupled to the walls 36, 37, 38, 39 of the lower shell 31.

The left side wall 36 is arranged to extend upwardly from the floor 35 along a left side of the floor 35, as shown in FIG. 4. The right side wall 37 is spaced apart from the left side wall 36 and is arranged to extend upwardly from the floor 35 along a right side of the floor 35. The front wall 38 is arranged to extend upwardly from the floor 35 along a front side of the floor 35 and extends from the left side wall 36 to the right side wall 37. The back wall 39 is arranged to extend upwardly from the floor 35 along a back side of the floor 35 and extends from the left side wall 36 to the right side wall 37.

The left side wall 36 of the lower shell 31 includes a main portion 44 and a recessed portion 46, as shown in FIGS. 4 and 5. The recessed portion 46 is indented from the main portion 44 toward the right side wall 37 to form a cavity 48 in the left side wall 36 that extends over more than half of left side wall 36 between the front wall 38 and the back wall 39. As shown in FIG. 5, the cavity 48 extends upwardly from a level of the floor 35. The left side wall 36 is also formed to include a left aperture 51 that extends through the recessed portion 46 of the left side wall 36 as shown in FIG. 4.

The right side wall 37 of the lower shell 31 is similar to the left side wall 36 of the lower shell 31 and includes a main portion 54 and a recessed portion 56, as shown in FIG. 6. The recessed portion 56 is indented from the main portion 54 toward the left side wall 36 to form a cavity 58 in the right side wall 37 that extends over more than half of left side wall 36 between the front wall 38 and the back wall 39. As shown in FIG. 5, the cavity 58 extends upwardly from a level of the floor 35. The right side wall 37 is also formed to include a right aperture 52 that extends through the recessed portion 56 of the right side wall 37.

Upper shell 32 includes a cap wall 60 coupled to the walls 36, 37, 38, 39 of the lower shell 31 and a projection 62 arranged to extend upwardly from the cap wall 60 as shown, for example, in FIG. 4. The projection 62 includes a pedestal 64 arranged to extend upwardly from the cap wall 60 and a platform 66 arranged to extend outwardly from the pedestal 64. The pedestal 64 and the platform 66 are formed to include contact slots 65 through which the power storage unit 24 is connected with the tool 12.

The pedestal 64, the platform 66, and the cap wall 60 cooperate to define a left side-opening channel 71 and a right side-opening channel 72, as shown in FIGS. 4-6. The left side-opening channel 71 receives a left inwardly-extending rail 74 included in the tool 12, and the right side-opening channel 72 receives a right inwardly-extending rail 76 included in the tool 12.

The pedestal 64 is formed to include a left retainer opening 81 and a right retainer opening 82, as shown in FIGS. 4-6. Left retainer opening 81 extends through the pedestal 64 and provides communication between the interior space 26 of the housing 20 and the left side-opening channel 71. Right retainer opening 82 extends through the pedestal 64 and provides communication between the interior space 26 of the housing 20 and the right side-opening channel 72.

The illustrative left and right release buttons 21, 22 are each monolithic components coupled to the housing 20 to pivot about corresponding pivot axes 21A, 22A, as shown in FIGS. 1 and 2. The left release button 21 includes a press pad 84, a retainer tooth 86, and a stem 88 interconnecting the press pad 84 and the retainer tooth 86. Similarly, the right release button 22 includes a press pad 94, a retainer tooth 96, and a stem 98 interconnecting the press pad 94 and the retainer tooth 96.

The press pads 84, 94 of the left and right release buttons 21, 22 are each arranged to extend through and fill the corresponding apertures 51, 52 formed in the left and right side walls 36, 37 of the lower shell 31, as shown in FIGS. 5 and 6. Thus, the press pads 84, 94 of the left and right release buttons 21, 22 are accessible to a user.

The retainer teeth 86, 96 of the left and right release buttons 21, 22 are each arranged to extend through the corresponding retainer openings 81, 82 formed in the pedestal 64 of the upper shell 32. Thus, the retainer teeth 86, 96 extend into the left and right side-opening channels 71, 72 of the upper shell 32.

In addition to the press pad 84, the retainer teeth 86, and the stem 88, the left release button 21 includes hinge pins 83, 85, as shown in FIG. 4. The hinge pins 83, 85 cooperate with hinge brackets 87, 89 included in the lower shell 31 of the housing 20 to provide pivot connections between the left release button 21 and the housing 20. Similarly, in addition to the press pad 94, the retainer teeth 96, and the stem 98, the right release button 22 includes hinge pins 93, 95, as shown in FIG. 4. The hinge pins 93, 95 cooperate with hinge brackets 97, 99 included in the lower shell 31 of the housing 20 to provide pivot connections between the right release button 22 and the housing 20.

In the illustrative embodiment, the left and right release buttons 21, 22 are independently movable between a locked position (see FIGS. 1, 7, and 8) and an unlocked position (see FIGS. 2, 9, and 10). As shown in FIG. 8, when the left and right release buttons 21, 22 are in the locked position, the retainer teeth 86, 96 extend through the retainer openings 81, 82 and are received in notches 75, 77 formed in the left and right inwardly-extending rails 74, 76 of the tool 12, thereby blocking the battery 14 from being moved away from the tool 12. As shown in FIG. 9, when the left and right release buttons 21, 22 are in the unlocked position, the retainer teeth 86, 96 are moved through the retainer openings 81, 82 toward the interior space 26 of the housing 20 and are moved out of the notches 75, 77 formed in the left and right inwardly-extending rails 74, 76 of the tool 12, allowing the battery 14 to be moved away from the tool 12.

In the illustrative embodiment, the tool 12 includes a tool body 102 and a battery receiver 104 as shown in FIGS. 1-4. The tool body 102 houses an electric motor 106. The motor 106 is configured to drive a tool output 108 when supplied with electrical power. The motor 106 is selectively supplied with electrical power from the battery 14 by a switch 110 coupled to the tool body 102.

The battery receiver 104 is illustratively formed as part of a handle 112 of the tool 12, as shown in FIGS. 1-4. The battery receiver 104 includes a downwardly opening bracket 114, the left inwardly-extending rail 74, and the right inwardly-extending rail 76. The battery receiver 104 receives the pedestal 64 and the platform 66 of the upper shell 32 of the battery 14 when the battery 14 is attached to the tool 12, as shown in FIG. 1.

According to one illustrative method of removing the battery 14 from the tool 12, a user grips the tool 12 with one hand (e.g., around the handle 112), while gripping the battery 14 with the other hand. The user may grip the battery 14 such that a plurality of fingers of the user's hand contact the left release button 21 and a heel of the user's hand contacts the right release button 22, as shown in FIG. 7. Alternatively, the user may grip the battery 14 such that a thumb of the user's hand contacts the right release button 22. The user may then move the left and right release buttons 21, 22 toward one another by squeezing the plurality of fingers and the heel (or thumb) of his/her hand toward one another, as shown in FIG. 9. This same movement is indicated by arrows 121, 122 in FIGS. 1 and 2.

When the left and right release buttons 21, 22 are moved toward one another, the retainer teeth 86, 96 disengage from the left and right inwardly-extending rails 74, 76 of the tool 12, so that the battery 14 is free to be moved relative to the tool 12. The user may then slide the battery 14 parallel to the left and right side walls 36, 37 of the battery 14 away from the tool 12, as suggested by arrow 120 in FIG. 3, so that the battery 14 is removed from the tool 12. It will be appreciated from the foregoing that, during this method of removing the battery 14 from the tool 12, while the user is able to maintaining his/her grip on the tool 12 with the one hand and his/her grip on the battery 14 with the other hand. In other words, the user does not need to adjust the grip on the battery 14 between moving the left and right release buttons 21, 22 to the unlocked position and moving the battery 14 away from the tool 12.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A cordless power tool battery comprising:
a housing having a first side wall and a second side wall spaced apart from the first side wall, the first side wall extending from a first end of the housing to a second end of the housing, the second side wall extending from the first end of the housing to the second end of the housing, and having a floor wherein the first and second side walls both extend upwardly from the floor, the first wall having a main portion and a recessed portion which is indented from the main portion and wherein the recessed portion extends upwardly from the floor, the second wall having a main portion and a recessed portion which is indented from the main portion and wherein the recessed portion extends upwardly from the floor, such that the width of the floor from the main portion of the first wall to the main portion of the second wall is greater than the width of the floor from the recessed portion of the first wall to the recessed portion of the second wall, and wherein the length along the floor of the recessed portion of the first wall is greater than the length of the main portion of the first wall along the floor and wherein the length along the floor of the recessed portion of the second wall is greater than the length of the main portion of the second wall along the floor; a first opening disposed through the recessed portion of the first wall; a second opening disposed through the recessed portion of the second wall;
a power storage unit supported in the housing, the power storage unit configured to supply electrical power to a cordless power tool removably coupled to the battery;
a first release button fitted into the first opening disposed through the recessed portion of the first wall and coupled to the housing, the first release button having a side wall and wherein a lowermost end of the side wall of the first release button is located outwardly from and beyond the floor and outwardly from and beyond the main portion of the first side wall of the housing, wherein the lowermost end of the side wall of the first release button forms a lowermost edge of the battery at the location of at least a portion of the first release button that is extended outwardly from and beyond the first side wall of the housing;
wherein the first release button further comprises:
a first stem extending upwardly away from the floor of the housing and to a distance above the floor greater than the distance above the floor of any portion of the side wall of the first release button and also extending inside an upper portion of the first side wall that extends from the first end of the housing to the second end of the housing above the recessed portion of the first wall; and
a first retainer positioned on the uppermost portion of the first stem, the first retainer extending outward through a retainer opening in the housing above the upper portion of the first side wall;
a second release button fitted into the second opening disposed through the recessed portion of the second wall and coupled to the housing, the second release button having a side wall and wherein a lowermost end of the side wall of the second release button is located outwardly from and beyond the floor and outwardly from and beyond the main portion of the second side wall of the housing, wherein the lowermost end of the side wall of the second release button forms a lowermost edge of the battery at the location of at least a portion of the second release button that is extended outwardly from and beyond the second side wall of the housing;
wherein the second release button includes:
a second stem extending upwardly away from the floor of the housing and to a distance above the floor greater than the distance above the floor of any portion of the side wall of the second release button and also extending inside an upper portion of the second side wall that extends from the first end of the housing to the second end of the housing above the recessed portion of the second side wall; and
a second retainer positioned on the uppermost portion of the second stem, the second retainer extending outward through a retainer opening in the housing above the upper portion of the second side wall.

2. The cordless power tool battery of claim 1, wherein the first release button comprises:
a retention feature adapted to engage a complementary retention feature included in the cordless power tool.

3. The cordless power tool battery of claim 2, wherein the floor of the housing is sized to receive a heel of a first hand of a user, engage the first release button with the heel of the first hand of the user, and engage the second release button with at least one finger of the first hand of the user.

4. The cordless power tool battery of claim 2, wherein:
the housing comprises a lower shell and an upper shell coupled to the lower shell; the lower shell is formed to include the floor and the first and second side walls, the first and second side walls extending upwardly from the floor; and
the upper shell is formed to include a cap wall coupled to the first and second side walls of the lower shell and a projection extending upwardly from the cap wall.

5. The cordless power tool battery of claim 4, wherein:
the projection comprises a pedestal extending upwardly from the cap wall and a platform extending outwardly from the pedestal;

the pedestal, the platform, and the cap wall cooperate to define a first side opening channel and a second side-opening channel, the second side-opening channel facing away from the first side-opening channel; and the first side-opening channel and second side-opening channel are sized to receive, respectively, a first rail and a second rail of the cordless power tool.

6. The cordless power tool battery of claim 5, wherein the pedestal is formed to include a retainer opening, the retention feature of the first release button extending through the retainer opening into the first side-opening channel.

7. The cordless power tool battery of claim 4, wherein the first aperture formed in the first wall is spaced apart from the upper shell.

8. The battery of claim 1 wherein the first retainer includes an uppermost and a lowermost surface, the lowermost surface of the first retainer being formed in a vertical position above any portion of the side wall of the first button; and wherein the second retainer includes an uppermost and a lowermost surface, the lowermost surface of the second retainer being formed in a vertical position above any portion of the side wall of the second button.

9. The battery of claim 1 wherein the first cavity includes a first hinge bracket positioned within the first opening and the second cavity includes a second hinge bracket positioned within the second opening, and wherein the first button includes a first hinge pin positioned to cooperate with the first hinge bracket and the second button includes a second hinge pin positioned to cooperate with the second bracket.

10. A cordless power tool battery comprising:

a housing having a first side wall and a second side wall spaced apart from the first side wall, the first side wall extending from a first end of the housing to a second end of the housing, the second side wall extending from the first end of the housing to the second end of the housing, and having a floor wherein the first and second side walls both extend upwardly from the floor, the first wall having a main portion and a recessed portion which is indented from the main portion and wherein the recessed portion extends upwardly from the floor, the second wall having a main portion and a recessed portion which is indented from the main portion and wherein the recessed portion extends upwardly from the floor, such that the width of the floor from the main portion of the first wall to the main portion of the second wall is greater than the width of the floor from the recessed portion of the first wall to the recessed portion of the second wall, and wherein the length along the floor of the recessed portion of the first wall is greater than the length of the main portion of the first wall along the floor and wherein the length along the floor of the recessed portion of the second wall is greater than the length of the main portion of the second wall along the floor; a first opening disposed through the recessed portion of the first wall; a second opening disposed through the recessed portion of the second wall;

a power storage unit supported in the housing, the power storage unit configured to supply electrical power to a cordless power tool removably coupled to the battery;

a first release button fitted into the first opening disposed through the recessed portion of the first wall and coupled to the housing, the first release button having a side wall and wherein a lowermost end of the side wall of the first release button is located outwardly from the floor and outwardly from and beyond the first side wall of the housing, wherein the lowermost end of the side wall of the first release button forms a lowermost edge of the battery at the location of at least a portion of the first release button that is extended outwardly from and beyond the first side wall of the housing; and wherein the first release button includes a first stem extending upwardly away from the floor of the housing and to a distance above the floor greater than the distance above the floor of any portion of the side wall of the first release button and also extending inside an upper portion of the first side wall that extends from the first end of the housing to the second end of the housing above the recessed portion of the first wall, and a first retainer extending outward through a retainer opening in the housing above the upper portion of the first side wall.

11. The cordless power tool battery of claim 10, further comprising a second release button fitted into the second opening disposed through the recessed portion of the second wall and coupled to the housing, the second release button having a side wall and wherein a lowermost end of the side wall of the second release button is located outwardly from and beyond the floor and outwardly from and beyond the main portion of the first side wall of the housing, wherein the lowermost end of the side wall of the first release button forms a lowermost edge of the battery at the location of at least a portion of the first release button that is extended outwardly from and beyond the second side wall of the housing.

12. The battery of claim 10 wherein the first retainer includes an uppermost and a lowermost surface, the lowermost surface of the first retainer being formed in a vertical position above any portion of the side wall of the first button; and wherein the second retainer includes an uppermost and a lowermost surface, the lowermost surface of the second retainer being formed in a vertical position above any portion of the side wall of the second button.

* * * * *